US005956354A

United States Patent [19]
Yan

[11] Patent Number: 5,956,354
[45] Date of Patent: Sep. 21, 1999

[54] DUAL MEDIA LASER WITH MODE LOCKING

[75] Inventor: Li Yan, Columbia, Md.

[73] Assignee: The University of Maryland Baltimore County, Baltimore, Md.

[21] Appl. No.: 08/659,855

[22] Filed: Jun. 6, 1996

[51] Int. Cl.[6] .................................................. H01S 3/098
[52] U.S. Cl. .............................. 372/18; 372/23; 372/68; 372/94; 372/69
[58] Field of Search ................................ 372/18, 23, 68, 372/94, 69

[56] References Cited

U.S. PATENT DOCUMENTS

| | | | |
|---|---|---|---|
| 4,554,666 | 11/1985 | Altman | 372/19 |
| 4,860,301 | 8/1989 | Nicholson | 372/68 |
| 4,910,746 | 3/1990 | Nicholson | 372/68 |
| 5,001,718 | 3/1991 | Burrows et al. | 372/68 |
| 5,148,445 | 9/1992 | Liu et al. | 372/97 |
| 5,272,713 | 12/1993 | Sobey et al. | 372/69 |
| 5,663,972 | 9/1997 | Payne et al. | 372/18 |
| 5,689,363 | 11/1997 | Dane et al. | 372/93 |

OTHER PUBLICATIONS

Yan et al;"Intracavity injection lasing in a hybrid neodymiun laser";Appl. Phys. Lett. 67(25),Dec. 18, 1995.
Malcolm et al;"Self–Mode Locking of a Diode–Puimped Nd:YLF Laser";Optics Letters,vol. 16,No.24 5 Dec. 1991, pp. 1967–1969.
Yan etal;"Intracavity injection lasing in a hybrid neodymium laser";Appl. Phys. Lett.67,(25),Dec. 18, 1995.
"Enhanced Mode Locking of Color–Center Lasers," P.N. Kean et al, Opt. Lett. 14, 39 (1989).
"60–fsec Pulse Generation From a Self–Modelocked Ti:Sapphire Laser," D.E. Spence et al, Opt. Lett. 16, 42 (1991).
"Additive Pulse Mode Locking," E.P. Ippen et al, J. Opt. Soc. Am. B 6, 1736 (1989).
"Generation of 11–fs Pulses form a Self–Mode–Locked Ti:Sapphire Laser," M.T. Asaki et al, Opt. Lett. 18, 977 (1993).
"Kerr Lens Mode Locking," T. Brabec et al, Opt. Lett. 17, 1292 (1992).
"Solid–State Low–Loss Intracavity Saturable Absorber for Nd:YLF Lasers: An Antiresonant Semiconductor Fabry–Perot Saturable Absorber," U. Keller et al, Opt. Lett. 17, 505 (1992).
"Low–Loss Intracavity Als/AlGaAs Saturable Bragg Reflector For Femtosecond Mode Locking in Solid–State Lasers," S. Tsuda et al, Opt. Lett. 20, 1406 (1995).
"Negative Dispersion Using pairs of Prisms," R.L. Fork et al, Appl. Phys. Lett. 9, 150 (1984).
"Chirped Multilayer Coatings for Broadband Dispersion Control in Femtosecond Lasers," R. Szipocs et al, Opt.Lett. 19, 201 (1994).
"Passive Mode Locking of Homogeneously and Inhomogeneously Broadened Lasers," J. Zehetner et al, Opt. Lett. 17, 871 (1992).
"Self–Starting Passive Mode Locking," F. Krausz et al, Opt. Lett. 16, 235 (1991).

(List continued on next page.)

*Primary Examiner*—Leon Scott, Jr.
*Attorney, Agent, or Firm*—Nath & Associates; Gary M. Nath; Harold L. Novick

[57] ABSTRACT

In a two laser media, Nd:phosphate glass and Nd:YLF are combined into a single laser. Generally, one broad band inhomogeneously broadened material and one narrow band homogeneously broadened material, with the two materials having overlapping center wavelengths are suitable.) The phase coherence property of Nd:YLF facilitates the initial formation of a coherent pulse. The broadband property of Nd:phosphate glass supports the generation of ultrashort laser pulse. Thus, this mode-locked hybrid Nd laser generates ultrashort coherent pulses more easily and reliably.

18 Claims, 13 Drawing Sheets

OTHER PUBLICATIONS

"Frequency–Modulation Mode Locking of a Diode–Pumped Nd:YAG Laser," G.T. Maker et al, Opt. Lett. 14, 788 (1989).

"Efficient Short–Pulse Generation From a Diode–Pumped Nd:YLF Laser With a Piezoelectrically Induced Diffraction Modulator," T. Juhasz et al, Opt. Lett. 15, 1458 (1990).

"Self–Starting Additive–Pulse Mode–Locked Diode–Pumped Nd:YAG Laser," J. Goodberlet et al, Opt. Lett. 15, 504 (1990).

"Self–Starting Additive–Pulse Mode Locking of a Nd:YAG Laser," L.Y. Liu et al, Opt. Lett. 15, 553 (1990).

"Passive Mode Locking of a cw Nd:YLF Laser with a Nonlinear External Coupled Cavity," J.K. Chee et al, Opt. Lett. 15, 686 (1990).

"Additive Mode Locking of a Diode–Pumped Nd:YLF Laser," G.P.A. Malcolm et al, Opt. Lett. 15, 1303 (1990).

"Kerr Lens Mode Locking of a Diode–Pumped Nd:YAG Laser," K.X. Liu et al, Opt. lett. 17, 1361 (1992).

"Self–Mode Locking of a Diode–Pumped Nd:YLF Laser," G.PA. Malcolm et al, Opt. Lett. 16, 1967 (1991).

"2.3–ps Pulses From a Kerr–Lens Mode–Locked Lam–Pumped Nd:YLF Laser With a Microdot Mirror," M. Ramaswamy et al, Opt. Lett. 18, 1825 (1993).

"Coupled–Cavity Resonant Passive Mode–Locked Nd:yttrium Lithium Fluoride Laser," U.Keller et al, Opt. Lett. 16, 390 (1991).

"Intracavity Injection Lasing in a Hybrid Neodymium Laser," L. Yan et al, Applied Phys. Lett. 67, 3679 (1995).

"Picosecond–Pulse Generation From a Continuous–Wave Neodymium:Phosphate Glass Laser," L. Yan et al, Opt. Lett. 11, 502 (1986).

"Mode Locking of a Continuous Wave Nd:Glass Laser Pumped by a Multistripe Diode Laser," F. Krausz et al, Applied Phys. Lett. 55, 2386 (1989).

"Self–Starting Additive–Pulse Mode Locking of a Nd:Glass Laser," F. Krausz et al, Opt. Lett. 15, 1082 (1990).

"Femtosecond Passive Mode Locking of a Solid State Laser by a Dispersively Balanced Nonlinear Interferometer," Ch. Spielmann et al, Applied Phys. Lett. 58, 2470 (1991).

"Self–Starting Femtosecond Mode–Locked Nd:Glass Laser That Uses Intracavity Saturable Absorbers," U.Keller et al, Opt. Lett. 18, 1077 (1993).

"Diode–Pumped Mode–Locked Nd:Glass Lasers With an Antiresonant Fabry–Perot Saturable Absorber," D. Kopf et al, Opt. Lett. 20, 1169 (1995).

"Single Longitudinal Mode Operation of High Pressure Pulsed $CO_2$ Lasers," A. Gondhalekar et al, Phys. Lett. 46A, 229 (1973).

"The Effects of the Insertion of a cw, Low–Pressure $CO_2$ Laser into a TEA $CO_2$ Laser Cavity," A. Girard, Opt. Comm. 11, 346 (1994).

DUAL MEDIA LASER WITH MODE LOCKING

BACKGROUND OF THE INVENTION

A. Field of the Invention

The present invention relates to the field of lasers. More particularly, the field of the invention relates to lasers with mode locking.

B. Prior Art Background

Since the birth of laser more than three decades ago, the generation of short and ultrashort laser pulses has continued to be one of the most important and active areas of laser physics and engineering. Compact, efficient, reliable, ultrashort pulse lasers are very useful for many ultrafast photonic applications. Interest in solid state lasers lies in their long energy storage times and good spatial and spectral properties.

For example, neodymium (Nd)-doped lasers are simple solid-state lasers that can produce ultrashort pulses with high average powers (Repetition rate can trade with pulse energy). They can be pumped by compact semiconductor diode laser arrays with very high efficiency and have very good beam quality.

Conventional lasers typically contain a single laser medium in their resonators. The properties of the laser medium influences fundamentally the performance of the laser. Nd:YLF and Nd:YAG lasers are homogeneously broadened, with $Nd^{3+}$ ions embedded in a crystalline background. The linewidths are ~6 $cm^{-1}$ and ~12 $cm^{-1}$, respectively. They have good phase coherence in the mode locking process, and easily produce coherent pulses especially by passive mode locking methods. However, their relatively narrow linewidths limit the pulse to widths of ~2 ps.

Commercial lamp-pumped, actively mode-locked Nd:YLF and Nd:YAG lasers produce, respectively, ~50 ps and ~100 ps pulses with average powers of ~20 watts. Somewhat shorter pulses have been produced from diode-pumped Nd:YAG and Nd:YLF lasers. Passive mode locking produces substantially shorter pulses. By additive-pulse mode locking, Kerr-lens mode locking, or using a semiconductor saturable absorber, Nd:YLF and Nd:YAG lasers can produce pulses ~1.5–7 ps, which are limited basically by the linewidths of the laser media. In general, start-up of various passive mode locking processes is easy, when the intracavity laser power is above a certain level.

On the other hand, Nd:glass is inhomogeneously broadened, with different $Nd^{3+}$ ions experiencing different local fields in an amorphous structure, has a wider linewidth, ~200–300 $cm^{-1}$, and is capable of generating and amplifying less than 100 fs pulses. But, very often, good phase coherence among the lasing axial modes is difficult to attain. This results in partially coherent pulses, difficult start-up in the passive mode locking process, and the gain bandwidth of Nd:glass cannot be fully utilized.

Although a Nd:glass laser was first mode-locked in 1966, continuous-wave (CW) mode-locked Nd:glass laser had not been realized until 1984. 7 ps pulses have been obtained from a CW, actively mode-locked Nd:phosphate glass laser pumped by an argon laser. Later, laser-diode-pumped, actively mode-locked Nd:glass lasers have been demonstrated, and 5–20 ps pulses have been obtained. Note that in the CW free-running state, the lasing bandwidth is about 7–15 $cm^{-1}$; when fully mode-locked, this bandwidth may allow generation of 2 ps pulses. It was observed, however, that often the available bandwidths can not be fully mode-locked to produce coherent ultrashort pulses and a Fabry-Perot etalon was needed to limit the bandwidth. Passive mode locking has been employed to produce much shorter pulses. By additive-pulse mode locking, 300–500 fs pulses have been generated. Using a semiconductor saturable absorber, 130 fs pulses were generated. In Nd-doped fiber lasers, owing to the very strong integrated nonlinearity in fiber, pulses as short as 70 fs have been generated. In general, however, passive mode locking of a Nd:glass laser is much more difficult than the Nd:YLF and Nd:YAG lasers, using similar mode locking mechanisms. Additive-pulse mode locking of Nd:glass is less stable and Kerr-lens mode locking of Nd:glass has not been demonstrated yet. This has been attributed to the difficulty of start-up of mode locking in Nd:glass lasers because of the presence of a large number of lasing axial modes and consequently a shorter coherence time of the initial spiking pulse. Experiments showed that the less inhomogeneously broadened the laser is, the easier the start-up and stable operation of the passive mode locking process.

Some lasers contain more than one laser media, but they lase independently. Some other laser systems consist of an oscillator and amplifiers. One example is using Nd:YLF or Nd:YAG in a mode-locked oscillator and Nd:glass in amplifiers. But the mode-locking performance of the oscillator does not improve.

SUMMARY OF THE INVENTION

The present invention provides a laser that uses two or more laser media in a single laser cavity and utilizes the complimentary properties of the different laser media to achieve better mode locking performance. This permits improved performance in generating ultrashort pulses.

In a preferred embodiment of the present invention, two laser media, Nd:phosphate glass and Nd:YLF are combined into a single laser. (Alternatively, Nd:silicate glass and Nd:YAG may be used. Generally, one broad band inhomogeneously broadened material and one narrow band homogeneously broadened material, with the two materials having overlapping center wavelengths are suitable.) The phase coherence property of Nd:YLF facilitates the initial formation of a coherent pulse. The broadband property of Nd:phosphate glass supports the generation of ultrashort laser pulse. Thus, this mode-locked hybrid Nd laser generates ultrashort coherent pulses more easily and reliably.

DESCRIPTION OF THE PREFERRED EMBODIMENTS

Figure 1:
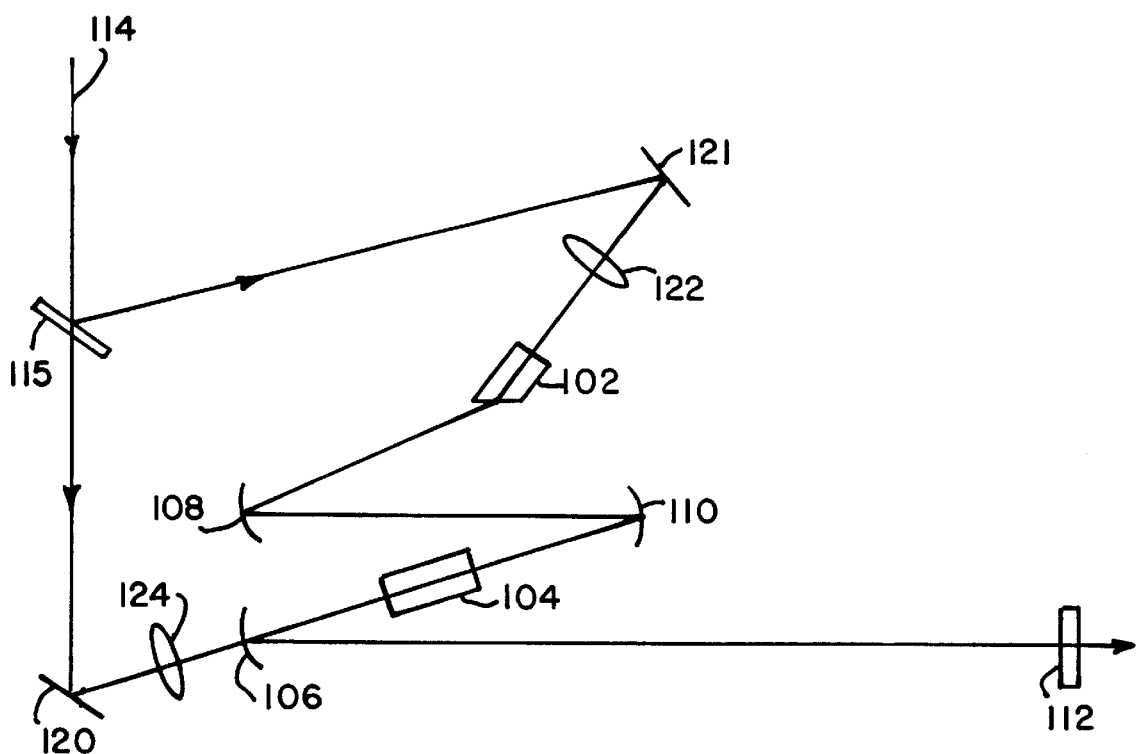
FIG. 1 is a diagram of a hybrid neodymium laser.

Before describing in detail specific preferred embodiments a brief description of mode locking in an ideal homogeneously broadened laser and in an extremely inhomogeneously broadened laser is described. This description will aid the reader in understanding the primary limitations on the generation of ultrashort pulses from these two different types of lasers and the operation of the present invention.

Mode Locking in Steady State

For an ideal homogeneously broadened laser, all lasing atoms share an identical transition line. Gain saturation occurs uniformly across the full line profile. In the free-running steady state only one or a few axial modes which experience the largest net gain are sustained. Thus, the laser has high coherence in the free-running state. When certain nonlinear modulation is introduced, sidebands of the center mode are generated consecutively and expand towards the wings of the line profile. In the steady state, spectral broadening from sideband generation is balanced by spectral narrowing from uniform gain saturation. Although generating and sustaining sidebands is not easy (which is reflected in the fact that the pulse bandwidth is usually much narrower than the gain linewidth), the generated sidebands are automatically in phase, resulting in a coherent pulse.

For an extremely inhomogeneously broadened laser, different species of atoms supply the gains for different axial modes. As long as the unsaturated gain for a given mode is larger than the cavity loss, this mode will lase and saturate the gain at only that frequency. Under moderate conditions the lasing bandwidth can approach the gain linewidth, and the number of lasing modes can be thousands. In the free-running state the relative phases among all the axial modes are random, resulting in noise-like radiation. The effect of nonlinear interaction is to lock the individual modes in phase through the injection of sideband signals; the additional bandwidth broadening is minimal. It is generally believed that phase locking of existing axial modes is much easier than excitation of axial modes and pulse widths should approach the inverse of the gain linewidths. The main impediments in the mode locking process are random noise and material dispersion. Random noise of each axial mode counters the coherence brought about by injection of sideband signals. When the injection locking process is disturbed appreciably, the resultant pulses may not be bandwidth-limited and are likely to be partially coherent. The material dispersion causes a nonuniform axial mode spacing (nonlinear frequency pulling) which in turn decreases the injection locking strength for axial modes further away from the gain center, limiting the usable optical bandwidth. (This is the equivalent description in the frequency domain of group velocity dispersion.)

Start-up of Mode Locking

From the viewpoint of start-up of (passive) mode locking, a mode-locked pulse is built from an initial intensity fluctuation, or spiking pulse, caused from random interference between modes. The nonlinear modulation will behave in such a way as to give less loss to the peak of the spiking pulse and a larger loss to the low amplitude background. The evolution of pulse-shaping depends on the nature (the magnitude and response time) of the nonlinearity, the typical amplitude of the initial spike, and the coherence time of the initial spike. The nonlinearities and typical amplitudes of the initial spikes are often about the same for lasers of various kinds. Homogeneously broadened lasers have few initial axial modes and the coherence time of the initial spike is long. Therefore, the shaping process of the initial spiking pulse is easy to continue and the laser is eventually mode-locked. For inhomogeneously broadened lasers, the large number of lasing axial modes causes a much shorter coherence time (due to random noise and nonuniform dispersion). Thus passive mode locking is much more difficult to self-start and sustain. This view of start-up of mode locking is complementary of the view of steady-state mode locking.

Continuous Wave Operation of a Dual Media Laser

FIG. 1 shows the schematic of a hybrid neodymium laser. The 5-mirror cavity contained two laser media: Nd:YLF and Nd:phosphate glass, identified in the figure as 102 and 104 respectively. The Nd:YLF rod 102 (with 1 wt % doping) was cut to lase at 1.053 $\mu$m. The two facets of the Nd:glass slab 104 (with ~1 wt % doping) were antireflection-coated at 1.054 $\mu$m. The normal-cut facet of the Nd:YLF rod and mirror 106 were dichroic-coated, with maximum transmission at ~800 nm and maximum reflection at 1.054 $\mu$m. The spherical mirrors 108, 110 and 106 have radii of curvature of 20 cm. The planar mirror 112 has a transmission coupling of 5%. The total cavity length was 1.5 m with the laser cavity extending from the normal cut facet of the Nd:YLF rod to mirror 112. A CW Ti:sapphire laser (not shown), pumped by an argon ion laser (not shown), was tuned at ~790 nm and used to end-pump the two laser media via Pump Beam 114, beam splitter 115, mirrors 120 and 121, and lenses 122 and 124.

Figure 2A:
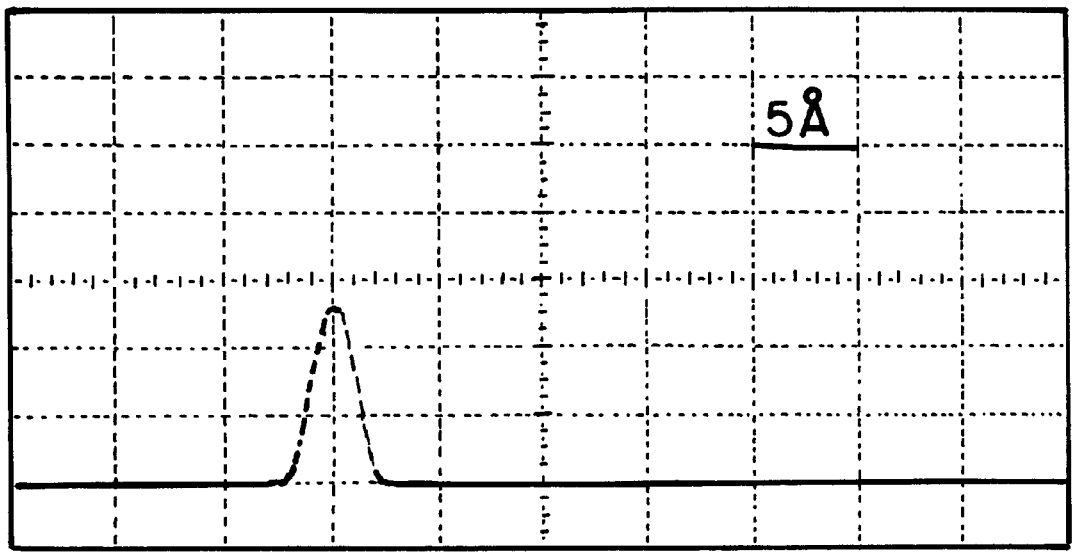
FIGS. 2(a)–(c) show the lasing spectra of Nd:YLF and Nd:glass when pumped alone 7.4 times and 2.1 times above their threshold levels and when both Nd:YLF and Nd:glass were pumped simultaneously.
Figure 2B:
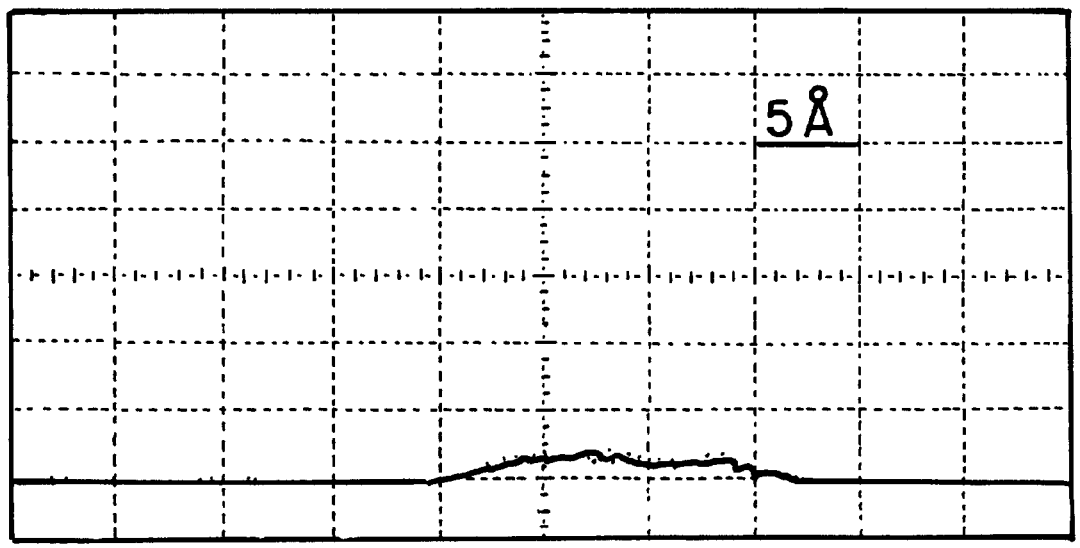
Figure 2C:
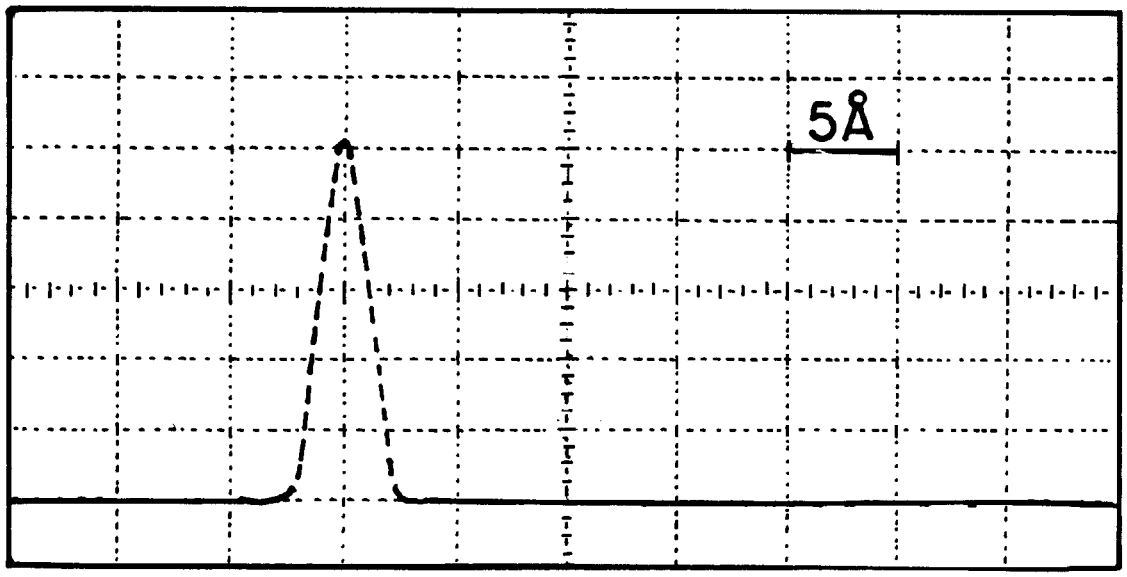
Figure 3A:
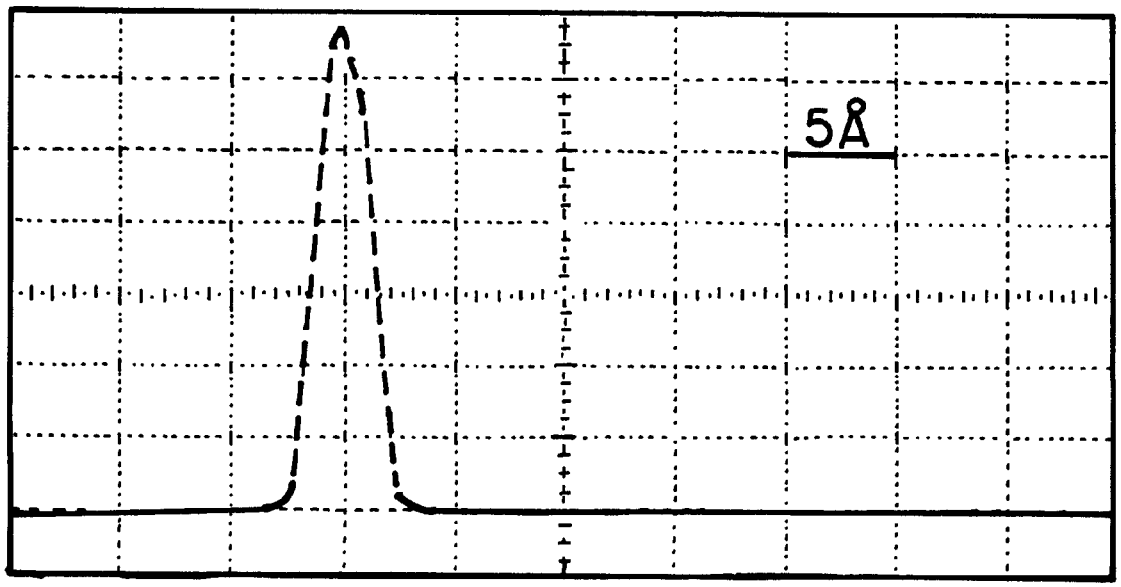
FIGS. 3(a)–(d) show the lasing spectra of the hybrid Nd laser when the pumping level of Nd:YLF was varied by using a set of attenuators.
Figure 3B:
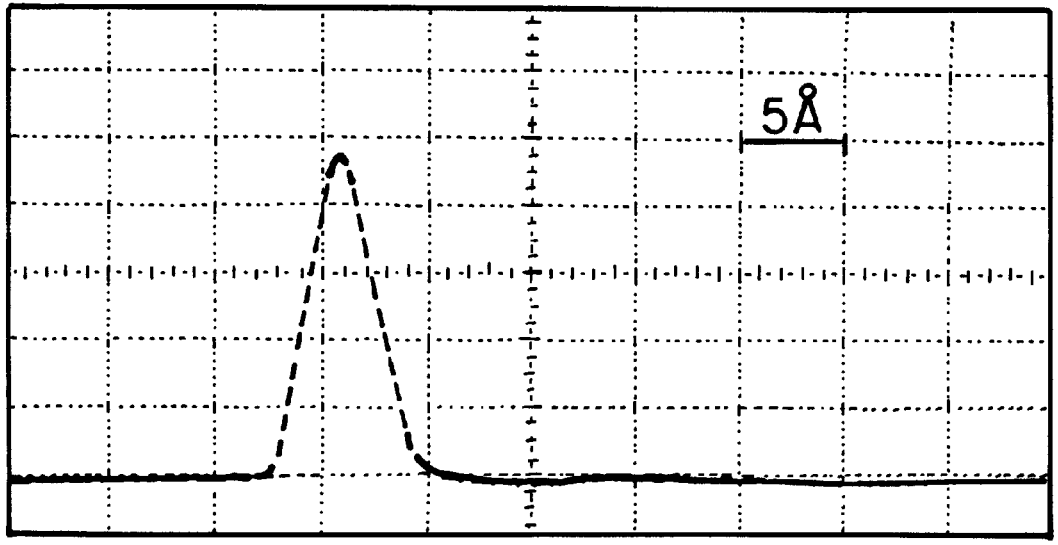
Figure 3C:
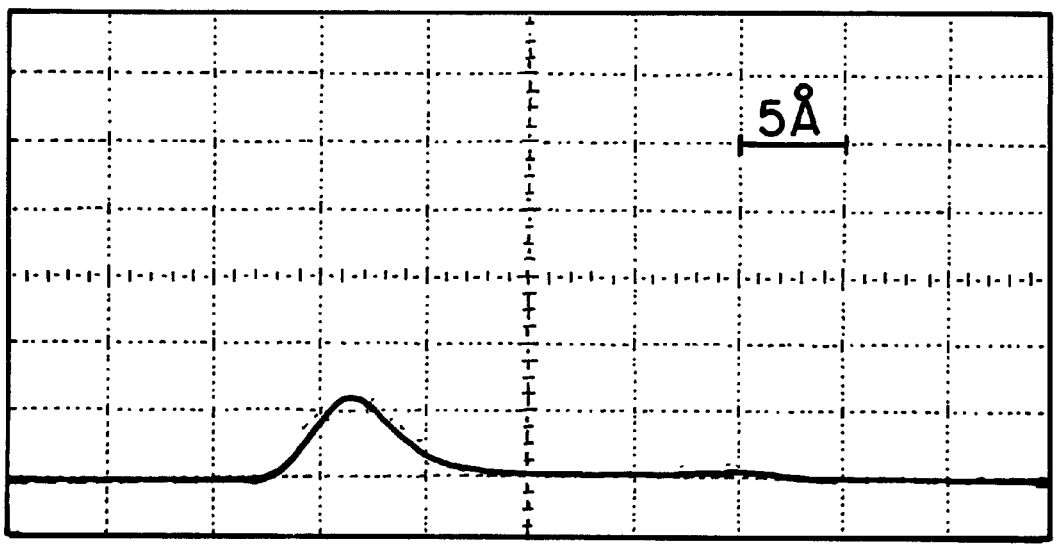
Figure 3D:
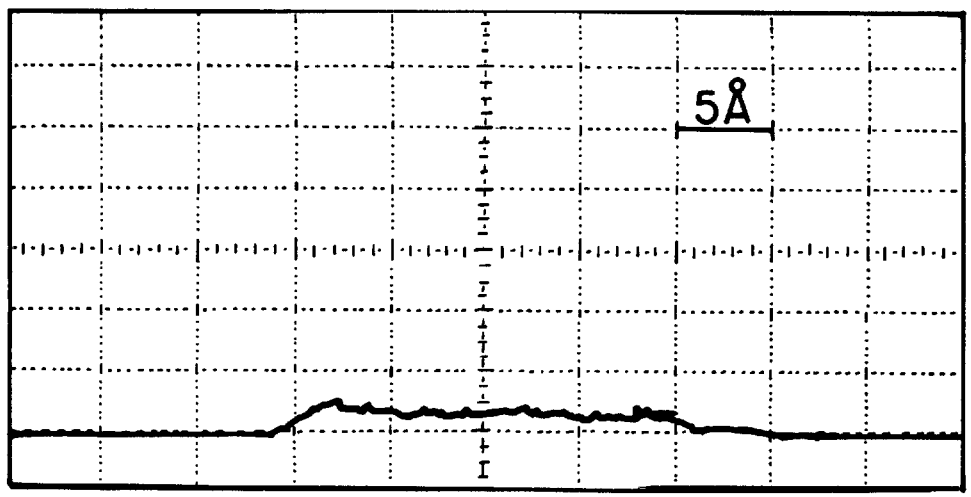

When the pump beam to Nd:glass was blocked, lasing was from Nd:YLF. Likewise, when the pump beam to Nd:YLF was blocked, lasing was from Nd:glass. FIGS. 2(*a*) and 2(*b*) show the lasing spectra of Nd:YLF and Nd:glass, when pumped alone 7.4 times and 2.1 times above their threshold levels, which were 23 mW and 136 mW respectively. The Nd:YLF spectrum has a narrow bandwidth of 2.7 Å. (The finite lasing bandwidth was similar to those observed in some other Nd:YLF and Nd:YAG lasers which have the gain medium at the end of a folded-cavity and is presumably caused by spatial hole-burning.) Nd:glass lased at a center wavelength ~12 Å away from the Nd:YLF line, as expected, with a broad bandwidth of ~10 Å. When both Nd:YLF and Nd:glass were pumped simultaneously, lasing of the hybrid laser was obtained and its spectrum is shown in FIG. 2(*c*). As can be seen in FIG. 2(*c*), the original Nd:glass lasing line at 1.054 $\mu$m was suppressed and lasing occurred only at 1.053 $\mu$m with a bandwidth of 2.7 Å. Essentially, the lasing contribution from Nd:glass was "locked" to that of Nd:YLF. In a simplified way, this can be viewed as lasing of Nd:glass through intracavity injection seeding from the Nd:YLF lasing signal.

Lasing behavior of the hybrid Nd laser was studied under different pumping levels of Nd:YLF. FIGS. 3(a)–(d) show the lasing spectra of the hybrid laser when the pumping level of Nd:YLF was varied (the unsaturated, normalized gain of Nd:YLF was (a)~10, (b)~1, (c)~0.375, and (d)~0.125) by using a set of attenuators from above to below its threshold while the pumping level of Nd:glass was kept 2.8 times above its threshold. Even when the pumping level of Nd:YLF was attenuated to about 2.6 times below its threshold, lasing of the hybrid Nd laser was still very similar to lasing of Nd:YLF alone. Only when the pump power of Nd:YLF was attenuated by ~8 times below its threshold value, lasing of the hybrid laser returned to nearly that of Nd:glass. In the absence of "seed" signals at the Nd:YLF line, the pulling of lasing spectra can be explained only by the competition of axial modes for the overall gain from both Nd:YLF and Nd:glass.

The situation in which the pump powers of Nd:YLF and Nd:glass varied but their ratio was fixed was also studied. It was observed that clear pulling of the Nd:glass spectrum to that of Nd:YLF can occur for the unsaturated gain ratio $g_{0,YLF}/g_{0,glass} > 0.25$.

Figure 4:
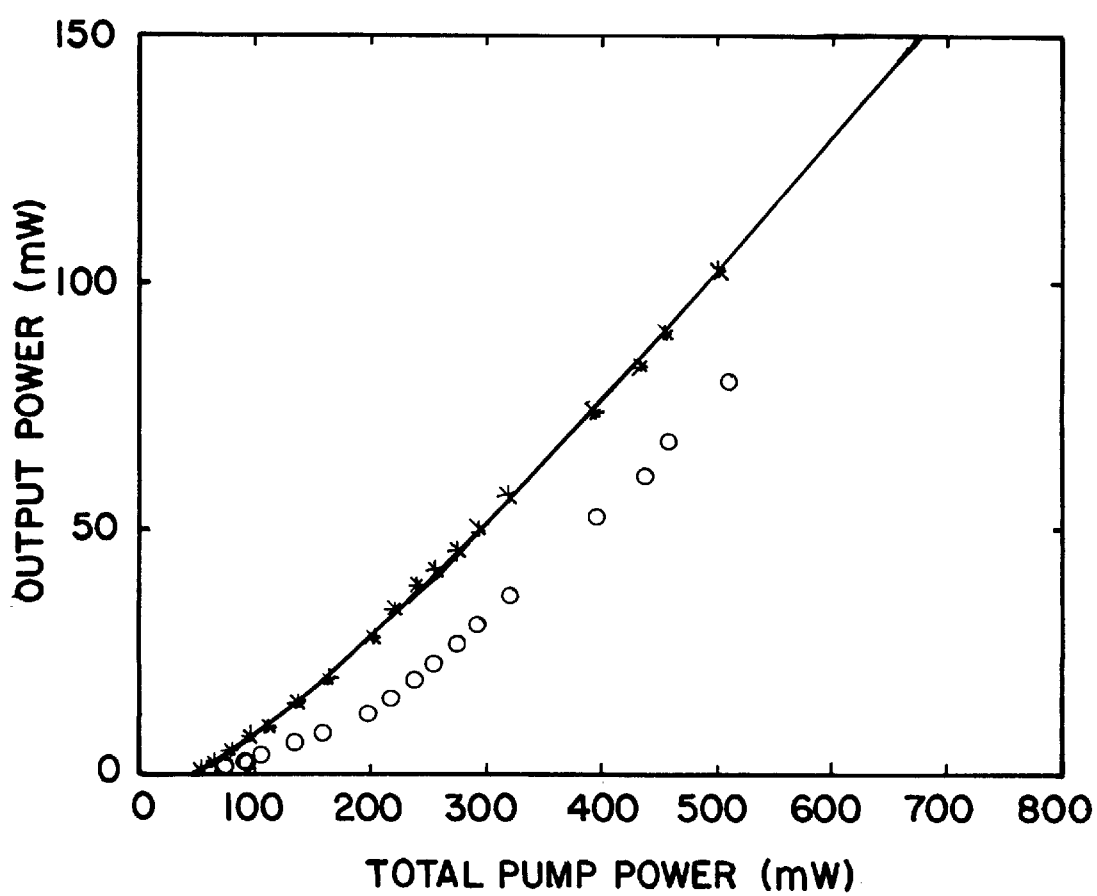
FIG. 4 shows the output powers of the hybrid Nd laser depicted in FIG. 1.

FIG. 4 shows the output powers of the hybrid laser depicted in FIG. 1. In the injection lasing situation, Nd:YLF and Nd:glass were saturated by the common laser signals. This cooperative saturation led to a lower threshold and a larger output power than the simple sum of the lasings by Nd:YLF and Nd:glass alone.

The output powers of the hybrid laser were calculated. Nd:YLF is a homogeneously broadened medium, and the Nd:glass is approximated as a simple partially inhomogeneously broadened medium centered at the wavelength of strongest stimulated emission and with an effective homogeneous to inhomogeneous linewidth ratio $\Delta v_h/\Delta v_{ih}$. The overall gain of the hybrid laser is the sum of the gains from Nd:glass and Nd:YLF. In the steady state a common set of lasing modes saturate the two gain media in a self-consistent manner. Using the known parameters of the laser media and resonator, the calculated powers were fitted to the measured laser output powers when only Nd:YLF or Nd:glass was pumped, respectively. Using the same set of parameters, the output power of the hybrid Nd laser was calculated when both Nd:YLF and Nd:glass are pumped (the solid curve in FIG. 4). The calculations agree well with the experimental results in all three cases.

Active Mode Locking of a Dual Media Laser

Conventional neodymium lasers contain a single laser medium, such as Nd:YLF or Nd:glass, in the cavity. They exhibit different advantages and disadvantages in mode-locking. Nd:YLF laser, which is homogeneously broadened, has good phase coherence in mode-locking. But its relatively narrow linewidth (~12 cm$^{-1}$) limits the pulsewidth. Nd:glass laser has a broad linewidth (~200 cm$^{-1}$) and can generate less than 100 fs pulses. But good phase coherence is often difficult to attain in mode-locking because it is inhomogeneously broadened. To fully utilize the broad linewidth of Nd:glass and overcome its problems in mode-locking, two laser media, i.e. Nd:YLF and Nd:glass, were used in a single cavity to form a hybrid (dual media) Nd laser for mode-locking.

Figure 5:
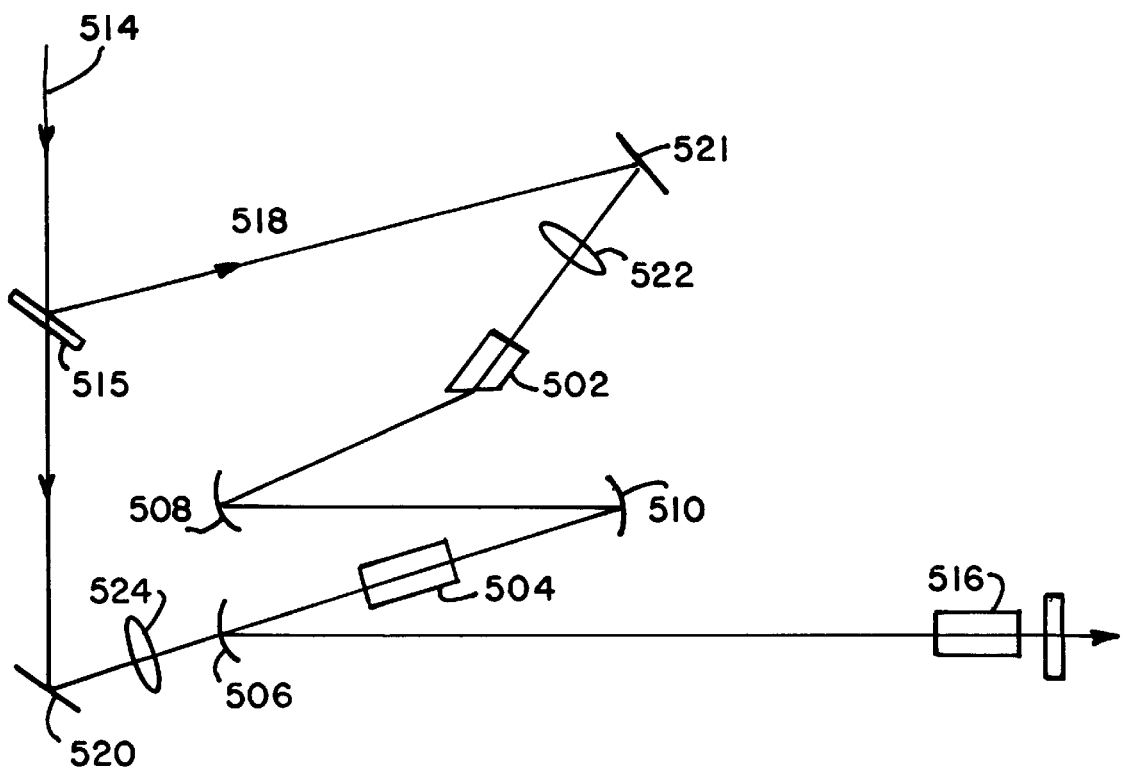
FIG. 5 is a diagram of an embodiment of a hybrid laser according to the principles of the present invention.
Figure 6A:
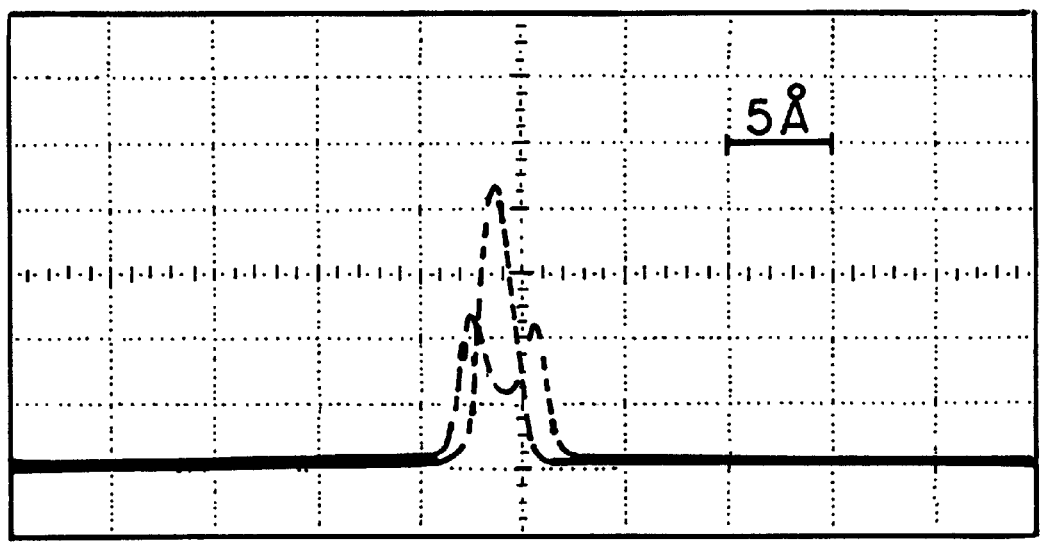
FIG. 6 (a) shows a typical spectrum of the actively mode-locked Nd:glass laser.
FIG. 6(b) shows the spectrum of the actively mode-locked hybrid Nd laser with the ratio of unsaturated gains $g_{0,YLF}/g_{0,glass} \approx 0.54$.
Figure 6B:
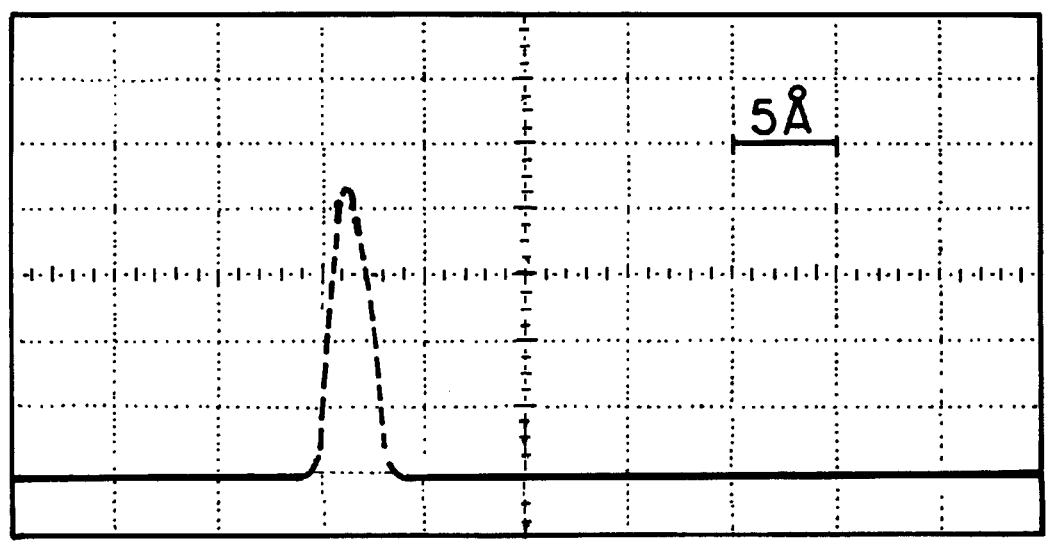
Figure 7:
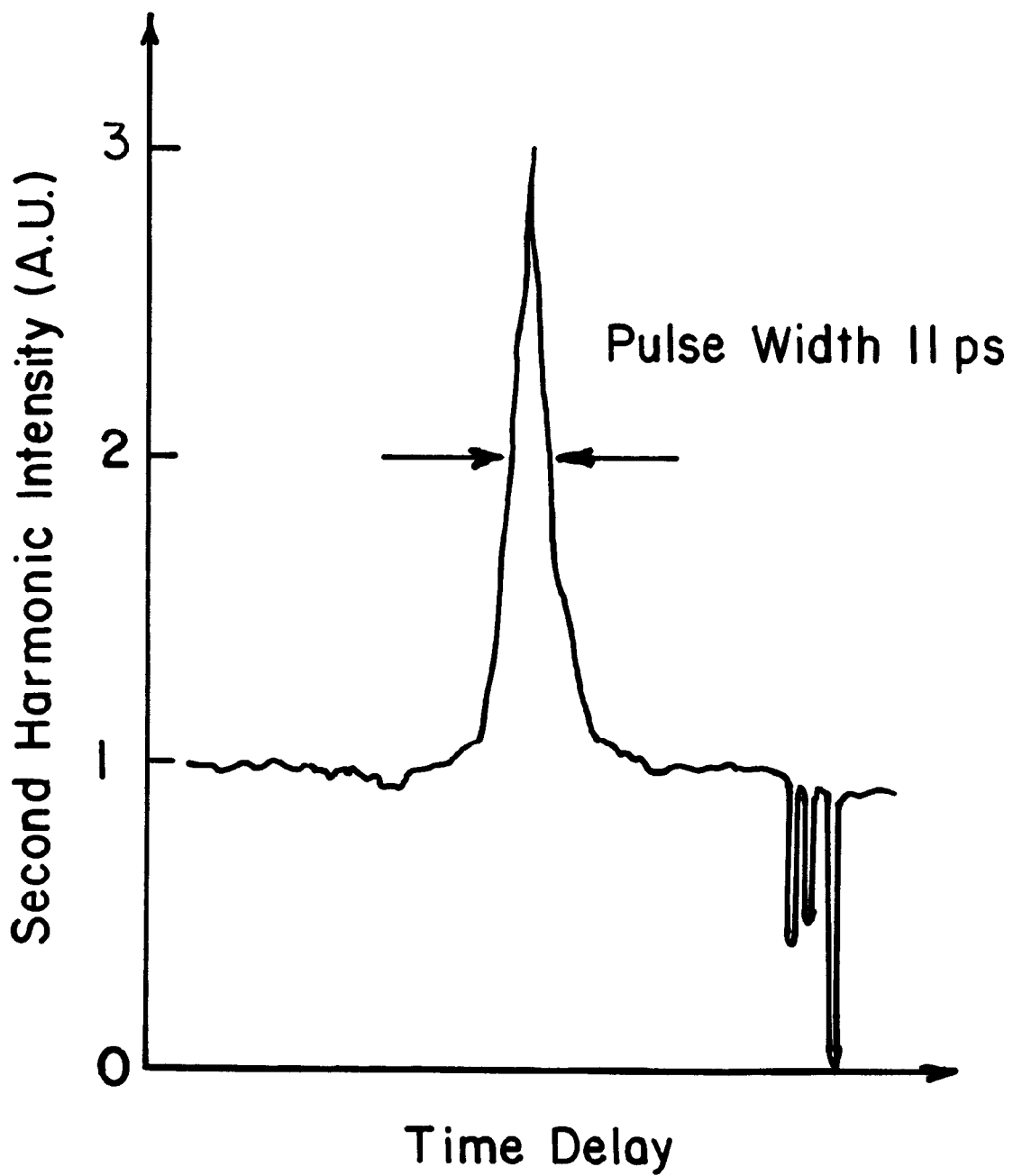
FIG. 7 shows the autocorrelation trace of the 11 ps pulses generated from a hybrid Nd laser.

Such a system is shown in FIG. 5. The five-mirror cavity contains two laser media: Nd:YLF and Nd:phosphate glass identified in the figure as 502 and 504 respectively. The Nd:YLF rod 502 (with 1 wt % doping) was cut to lase at 1.053 $\mu$m. The two facets of the Nd:glass slab 504 (with ~1 wt % doping) were antireflection-coated at 1.054 $\mu$m. The normal-cut facet of the Nd:YLF rod and mirror 506 were dichroic-coated, with maximum transmission at ~800 nm and maximum reflection at 1.054 $\mu$m. The spherical mirrors 508, 510 and 506 have radii of curvature of 20 cm. The planar mirror 512 has a transmission coupling of 5%. A CW Ti:sapphire laser (not shown) tuned at ~790 nm was used to end pump the Nd:YLF and Nd:glass media separately via Pump Beam 514, beam splitter 515, mirrors 520 and 521, and lenses 522 and 524. An acousto-optic modulator 516 (AOM) (for example, a piezo-electrically induced strain optic modulator), with two facets antireflection-coated at 1.054 $\mu$m, was used as the mode-locker. When the pump beam 518 of Nd:YLF was blocked, the gain of the hybrid Nd laser came only from Nd:glass and the lasing spectrum showed the unstable characteristics of Nd:glass laser in mode-locking. The spectrum fluctuated with broad bandwidth between 3 to 5 Å when one attempted to get short pulses. FIG. 6(a) shows a typical spectrum when only Nd:glass was pumped. The pulses were partially coherent and varied between 28 and 70 ps. When Nd:glass and Nd:YLF were pumped simultaneously, the spectrum of Nd:glass was stabilized and pulled to that of Nd:YLF, and the bandwidth was narrowed down to 2~2.5 Å. FIG. 6(b) shows the spectrum of the mode-locked hybrid laser with the ratio of unsaturated gains $g_{0,YLF}/g_{0,glass} \approx 0.54$. With a stable and narrow spectrum, phase coherence among sidebands was ensured and shorter pulses with good coherence were generated. FIG. 7 shows the autocorrelation trace of the 11 ps pulses generated from the hybrid Nd laser. The pulses had a bandwidth-pulsewidth product $\Delta v \Delta \tau \approx 0.60$.

Figure 8:
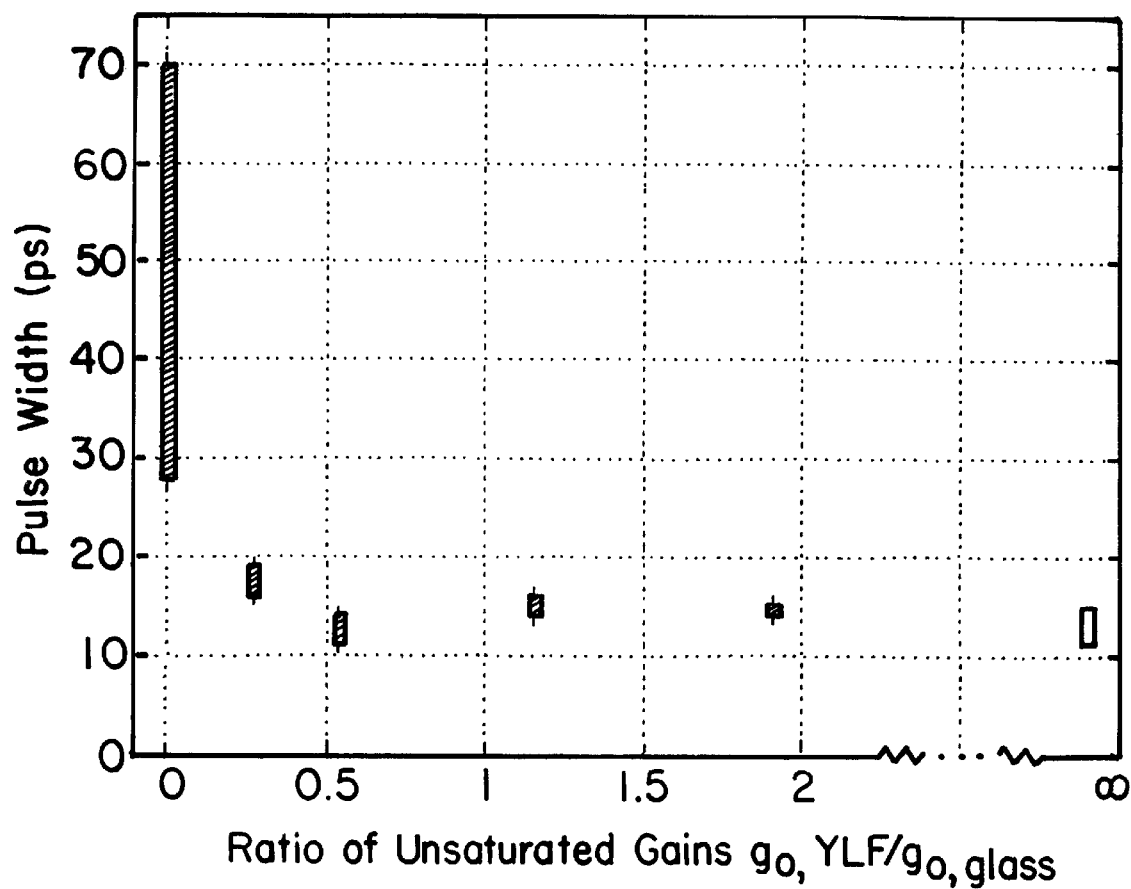
FIG. 8 shows pulsewidths at different unsaturated gains from Nd:YLF and Nd:glass.

The pulsewidth dependence on the gain of Nd:YLF was studied. Nd:glass was pumped at a fixed level with an unsaturated inversion ratio $r_{0,YLF}=2.5$, and Nd:YLF was pumped at different levels, with $r_{0,YLF}/r_{0,glass}$ varying from 0 to 1.9. With the increase of the gain of Nd:YLF, the lasing spectrum became more and more stable. When $r_{0,YLF}/r_{0,glass}>0.27$, the mode-locked hybrid Nd laser exhibited a smooth, narrow bandwidth spectrum, showing that a small gain from Nd:YLF can control the spectrum of Nd:glass in mode-locking. Under this condition, the phase coherence among sidebands was improved and coherent short pulses of less than 19 ps can be routinely generated. FIG. 8 shows the pulse widths at the ratio of unsaturated gains $g_{0,YLF}/g_{0,glass}=$ 0, 0.27, 0.54, 1.2 and 9, respectively. The unfilled circle is for the case when only Nd:YLF was pumped.

Figure 9A:
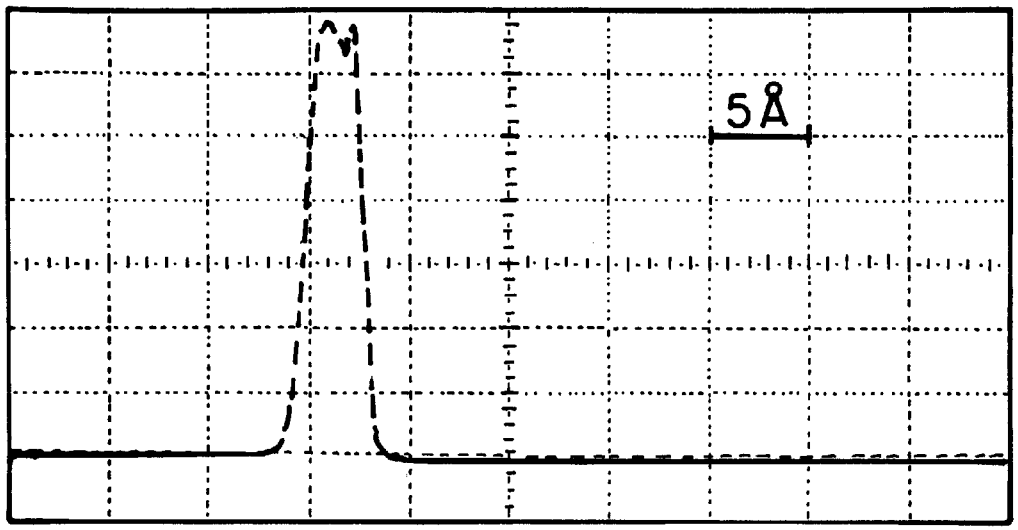
FIGS. 9(*a*) and (*b*) show the free running spectrum when the AOM was turned off and the mode-locked spectrum when the AOM was turned on, respectively.
Figure 9B:
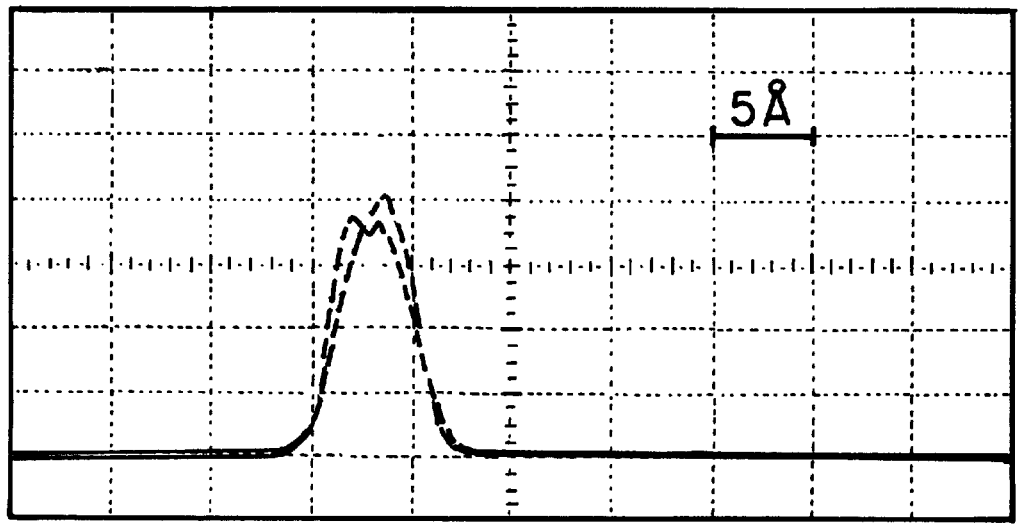

Self-adaptive spectral control was observed. When the AOM was turned off, the bandwidth of the CW hybrid Nd laser was ~2.9 Å (See FIG. 9(a)). When the AOM was turned on, the bandwidth broadened to ~4.8 Å and pulses of less than 15 ps with good coherence were generated (see FIG. 9 (b)). Under the same mode locking condition, the pulse bandwidth did not exceed 2.7 Å when only Nd:YLF was pumped. This indicates that the broadband Nd:glass can facilitate broadening of bandwidth in accordance with the mode locking force. With active mode locking, the lockable bandwidth, and consequently the pulsewidth, is limited by the mode-locking ability of the AOM. Utilizing passive mode locking, the full linewidth of Nd:glass can be utilized.

The two media were chosen because their lasing line centers are almost coincided: Nd:phosphate glass at 1.054 $\mu$m with a linewidth ~200 cm$^{-1}$ and Nd:YLF at 1.053 $\mu$m with a linewidth~12 cm$^{-1}$. The phase coherence property of Nd:YLF is used to facilitate the initial formation of a coherent pulse. The broadband property of Nd:glass is used to support the generation of ultrashort laser pulses. Thus, in this hybrid laser passive mode locking can be initiated easily by the action of Nd:YLF and the wide bandwidth of the laser pulse can be supported by the Nd:glass.

The hybrid laser of the present invention has many applications and can be constructed in numerous embodiments. For example, active mode locking of the hybrid laser can be accomplished using an electro-optic modulator as the mode locker.

Alternatively, the use of passive mode locking techniques allows the hybrid laser to exhibit its full advantages. Passive mode locking in general gives much stronger mode locking force than active mode locking and can generate femtosecond laser pulses. However, the start-up of passive mode locking is difficult in a broadband, inhomogeneously broadened laser. The gain bandwidth, signal phase coherence, and intracavity laser power are all important to self-started, passive mode locking. In a single-gain-medium laser, adjustment of parameters is often limited. In the hybrid laser of the present invention, the possibilities of parameter adjustment are greatly increased. In particular, the phase coherence property of Nd:YLF facilitates the initial formation of a coherent pulse and starts the mode locking process. As the pulse is shortened by mode locking, the broadened bandwidth is supported by the broadband Nd:glass. Thus, the passively mode-locked hybrid Nd laser generates ultrashort coherent pulses more easily and reliably. Depending on the respective pumping levels of the two laser media, one or other factors may be favored. With increasing gain of Nd:YLF, the hybrid laser has high phase coherence and high laser power (the stimulated emission cross section of Nd:YLF is about four times larger than Nd:phosphate glass), but the gain bandwidth is narrow. With much more energy stored in Nd:glass, the hybrid laser has broadband gain, but the laser power is reduced for a given total pump power. The gains of Nd:YLF and Nd:glass can be adjusted to give optimum performance.

Figure 10:
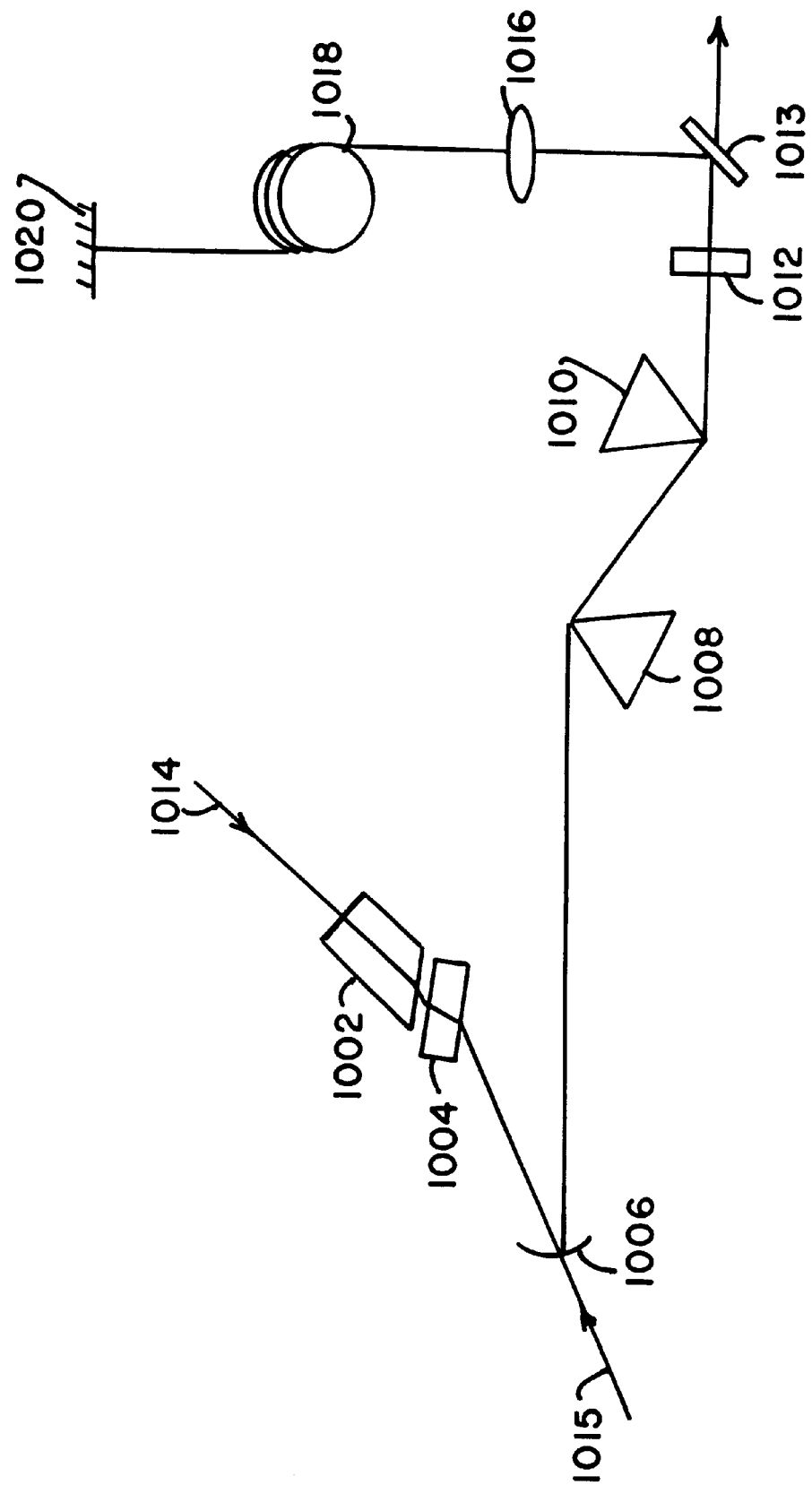
FIG. 10 is a diagram of a hybrid laser using additive-pulse mode locking according to the principles of the present invention.

FIG. 10 shows the schematic diagram of additive-pulse mode locking of the hybrid Nd laser. Such a system for a single material laser is described in, for example, P. N. Kean, X. Zhu, D. W. Crust, R. S. Grant, N.Langford, and W. Sibbett, "Enhanced mode locking of color-center lasers," Opt. Lett. 14, 39 (1989) and E. P. Ippen, H. A. Haus, and L. Y. Liu, "Additive pulse mode locking," J. Opt. Soc. Am. B 6, 1736 (1989). The interference of the main pulse and the pulse (from the auxiliary cavity) with a nonlinear phase shift (which occurs in the optical fiber) provides the pulse shaping mechanism. Such a system includes a laser source(s) (not shown) to generate pump beams 1014 and 1015, a dichroic coating on the normal cut end of the Nd:YLF rod 1002, Nd:glass slab 1004, dichroic-coated mirror 1006, first prism 1008, second prism 1010, output light coupler (a mirror with small transmission) 1012, beam splitter 1013, lens 1016, single-mode optic fiber 1018, and mirror 1020.

Figure 11:
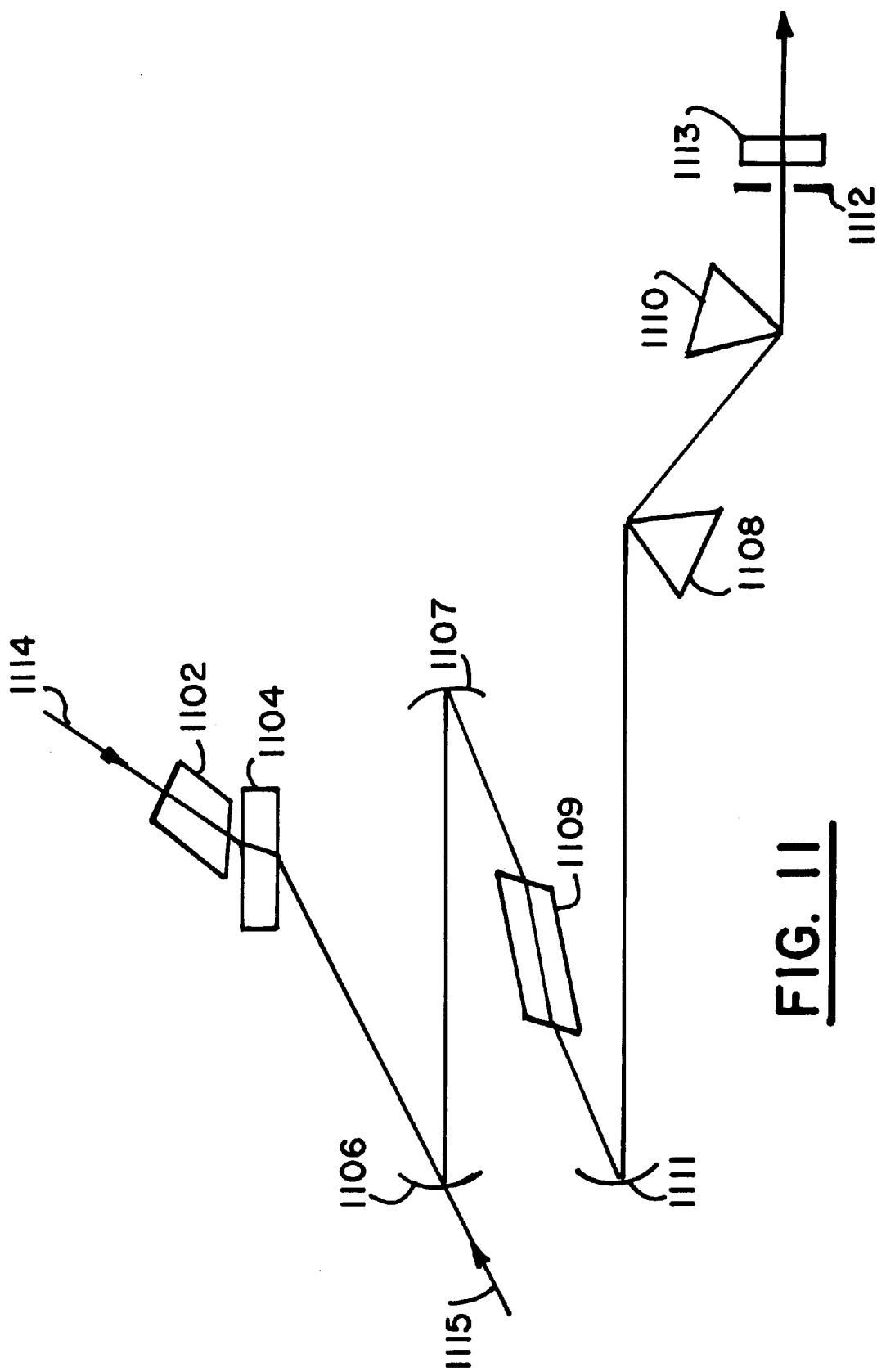
FIG. 11 is a diagram of a hybrid laser using Kerr-lens mode locking according to the principles of the present invention.

For Kerr-lens mode locking, the intracavity nonlinear phase shift due to self-focusing and self-phase modulation must be large enough to produce appreciable pulse shaping. Kerr-lens systems for a single material laser are described, for example in: D. E. Spence, P. N. Kean, and W. Sibbett, "60-fsec pulse generation from a self-mode-locked Ti-Sapphire laser," Opt. Lett. 16, 42 (1991); T. Brabec, C. Spielmann, P. F. Curley, and F. Krausz, "Kerr lens mode locking," Opt. Lett. 17, 1292 (1992); M. T. Asaki, C. P. Huang, D. Garvey, J. Zhou, H. C. Kapteyn, and M. M. Murnane, "Generation of 11 fs pulses form a self-mode-locked Ti:Sapphire laser," Opt. Lett. 18, 977 (1993). One method to increase the nonlinear phase shift is to use a Kerr medium that has large nonlinear index of refraction, such as SF-57 glass. FIG. 11 shows the schematic diagram of Kerr-lens mode locking of the hybrid Nd laser. Such a system includes a laser source(s) (not shown) to generate a pump beam 1114 and 1115, a dichroic coating on the normal cut end of the Nd:YLF rod 1102, Nd:glass slab 1104, dichroic-coated mirror 1106, mirror 1107, Kerr medium 1109, mirror 1111, first prism 1108, second prism 1110, aperture 1112 and output light coupler (a mirror with small transmission) 1113.

Figure 12:
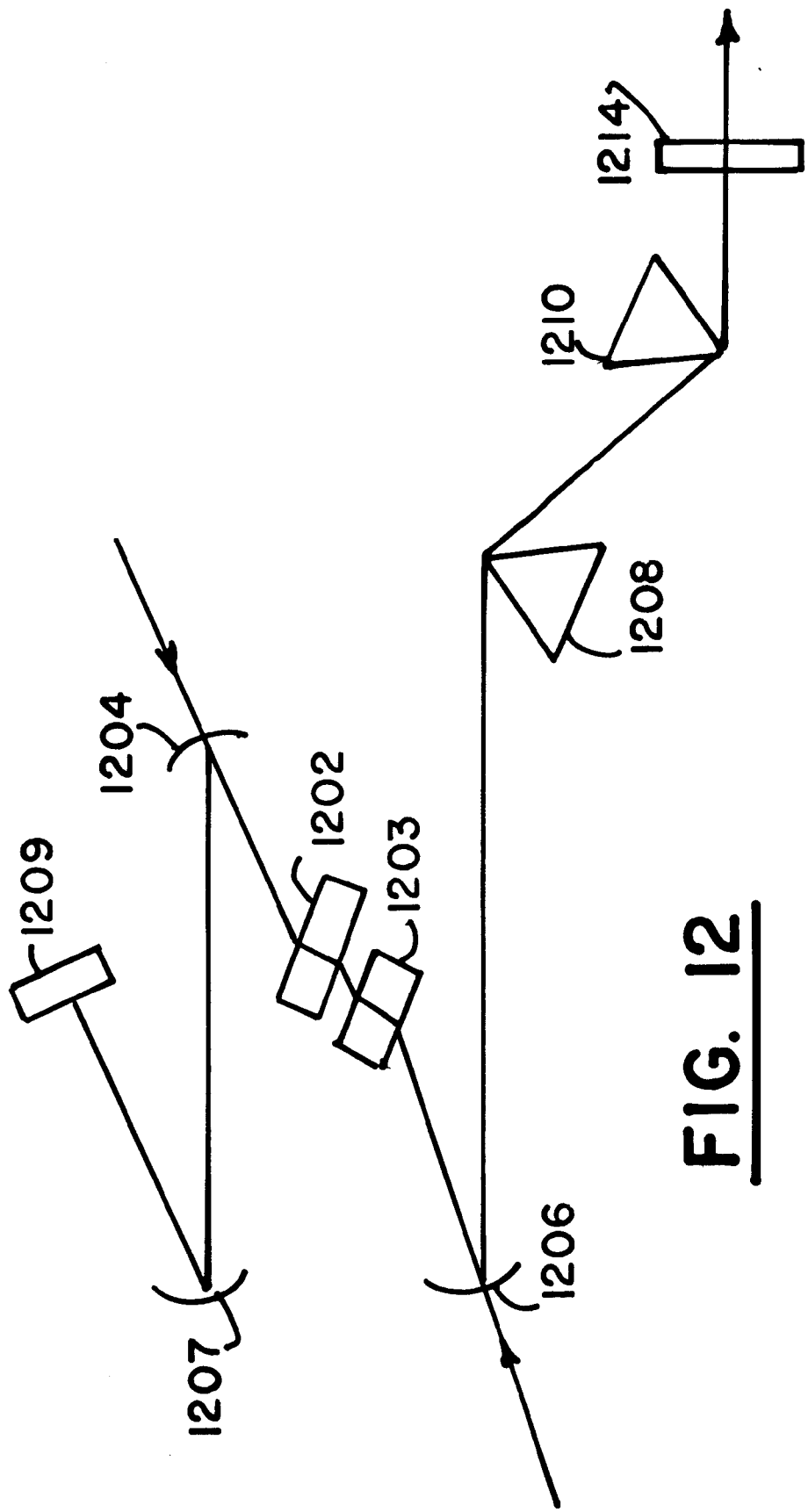
FIG. 12 is a diagram of a hybrid laser employing a quantum-well saturable absorber according to the principles of the present invention.

Semiconductor quantum-well saturable absorbers can also be employed to passive mode lock the hybrid laser. Such systems for single material lasers are described in U. Keller, D. A. B. Miller, G. D. Boyd, T. H. Chiu, F. J. Ferguson, and M. T. Asom, "Solid-state low-loss intracavity saturable absorber for Nd:YLF lasers: an antiresonant semiconductor Fabry-Perot saturable absorber," Opt. Lett. 17, 505 (1992) and S. Tsuda, W. H. Knox, E. A. de Souza, W. Y. Jan, and J. E. Cunningham, "Low-loss intracavity AlAs/AlGaAs saturable Bragg reflector for femtosecond mode locking in solid-state lasers," Opt. Lett. 20, 1406 (1995). FIG. 12 shows the schematic diagram of the hybrid laser employing a quantum-well saturable absorber. Such a system includes a laser source(s) (not shown) for pumping, a Nd:YLF rod 1202, Nd:glass slab 1203 (with both the rod and the slab being placed at the Brewster angle to the intracavity laser beam), dichroic coated mirrors 1204 and 1206, mirror 1207, quantum-well saturable absorber 1209, first prism 1208, second prism 1210, and output light coupler (a mirror with small transmission) 1214.

In the generation of ultrashort femtosecond laser pulses by passive mode locking, compensation of group velocity dispersion is very important. A dispersion compensation device, such as a prism sequence or a dispersion-controlled, chirped mirror, is needed in the laser resonator.

Preferably, the hybrid laser is constructed with a composite gain module consisting of the dual laser media, for example, Nd:YLF and Nd:glass. The two laser media, grown and fabricated separately, are assembled closely together. The doping levels and thicknesses of the Nd:YLF and Nd:glass media are determined based on the optimum range of the pump power ratio. Using a single gain module simplifies the laser resonator, and only a single pump beam is needed.

Further, the hybrid Nd laser can be pumped by semiconductor laser diodes, leading to compact, high-efficiency, low cost, reliable, femtosecond pulse, all-solid-state lasers and laser systems.

While the present invention has been specifically described with reference to the accompanying figures, and with emphasis on certain materials and arrangements, it should be understood that the figures are for illustration only and should not be taken as limitations upon the invention. It is contemplated that many changes and modifications may be made, by one of ordinary skill in the art, to the apparatus and method described herein without departing from the spirit and scope of the invention as claimed below.

I claim:

1. A laser comprising:
   a laser cavity;
   a first laser material located in said laser cavity;
   a second laser material located in said laser cavity so that said second laser material can be lased with said first laser material;
   said second laser material having different material properties than said first laser material, but having overlapping lasing wavelengths; and means for simultaneously pumping said first and said second laser materials so that said laser materials are lased together.

2. The laser of claim 1, and further including means for generating ultra short pulses from said laser.

3. The laser of claim 2, wherein said first laser material is Nd:phosphate glass and said second laser material is Nd:YLF.

4. The laser of claim 2, wherein said first laser material is Nd:silicate glass and said second laser material is Nd:YAG.

5. The laser of claim 2, wherein said pulse generating means includes a means for mode locking said laser.

6. The laser of claim 5, wherein said mode locking means comprises a means for passive mode locking said laser; and said laser further comprising a means for providing dispersion compensation, said compensation means being located in said laser cavity for producing limited laser pulses.

7. The laser of claim 6, wherein said means for passive mode locking comprises means for additive-pulse mode locking.

8. The laser of claim 5, wherein said means for passive mode locking comprises a Kerr-medium.

9. The laser of claim 6, wherein said means for passive mode locking comprises a saturable absorber.

10. The laser of claim 9, wherein said means for mode locking comprises a semiconductor quantum well saturable absorber.

11. The laser of claim 5, wherein said means for mode locking comprises an acousto-optic modulator.

12. The laser of claim 5, wherein said means for mode locking comprises a piezo-electrically induced strain optic modulator.

13. The laser of claim 5, wherein said means for mode locking comprises an electro-optic modulator.

14. The laser of claim 1, wherein said laser pumping source are laser diodes.

15. A method for generating laser pulses using two or more laser media in a laser, the method comprising the steps of:

providing at least one broad band laser medium and one narrow band laser medium in a single laser resonator with the two media having overlapping lasing wavelengths;

providing a means for simultaneously pumping said laser media;

simultaneously pumping said laser media;

providing a means for mode locking the laser; and using said means for mode locking the laser, with the narrow band laser medium providing control of pulse coherence and the broad band laser medium providing support of broad bandwidth.

16. The method of claim 15 further including the step of compensating for dispersion.

17. A mode locked laser which generates ultra short pulses comprising:

a laser resonator having a cavity;

a plurality of laser media that have different lasing properties, at least two of said laser media having partial overlapping bands, wherein a first laser media is a broad band, inhomogeneously broadened material and a second laser media is a narrow band, homogeneously broadened material;

a means for mode locking said laser; and a means for simultaneously pumping said laser media so that said laser media are lased together.

18. A laser according to claim 17, further comprising means located in said laser cavity for compensating for dispersion.

* * * * *

UNITED STATES PATENT AND TRADEMARK OFFICE
CERTIFICATE OF CORRECTION

PATENT NO.   : 5,956,354
DATED        : September 21, 1999
INVENTOR(S)  : Yan

It is certified that error appears in the above-identified patent and that said Letters Patent is hereby corrected as shown below:

Claim 8, line 1, replace "5" with --6--

Signed and Sealed this

Seventh Day of March, 2000

Attest:

Q. TODD DICKINSON

*Attesting Officer*   *Commissioner of Patents and Trademarks*